July 29, 1958  G. E. IDDINGS  2,845,623
AIRCRAFT NAVIGATION SYSTEM
Filed Jan. 3, 1956  7 Sheets-Sheet 3

INVENTOR
GEORGE E. IDDINGS
BY
ATTORNEY

July 29, 1958 G. E. IDDINGS 2,845,623
AIRCRAFT NAVIGATION SYSTEM
Filed Jan. 3, 1956 7 Sheets-Sheet 4

INVENTOR
GEORGE E. IDDINGS
BY
ATTORNEY

July 29, 1958      G. E. IDDINGS      2,845,623
AIRCRAFT NAVIGATION SYSTEM
Filed Jan. 3, 1956      7 Sheets-Sheet 5

INVENTOR
GEORGE E. IDDINGS
BY
ATTORNEY

INVENTOR
GEORGE E. IDDINGS
BY
ATTORNEY

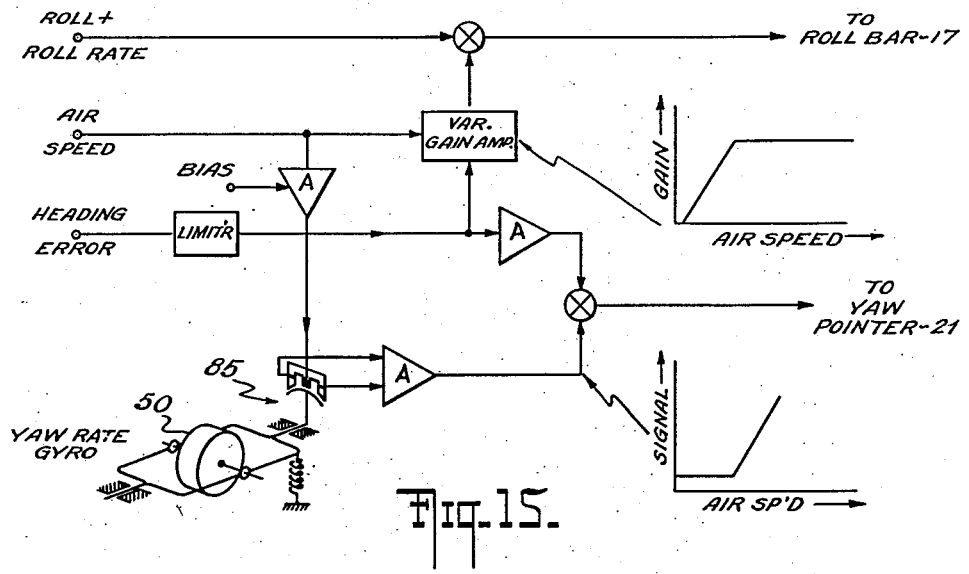
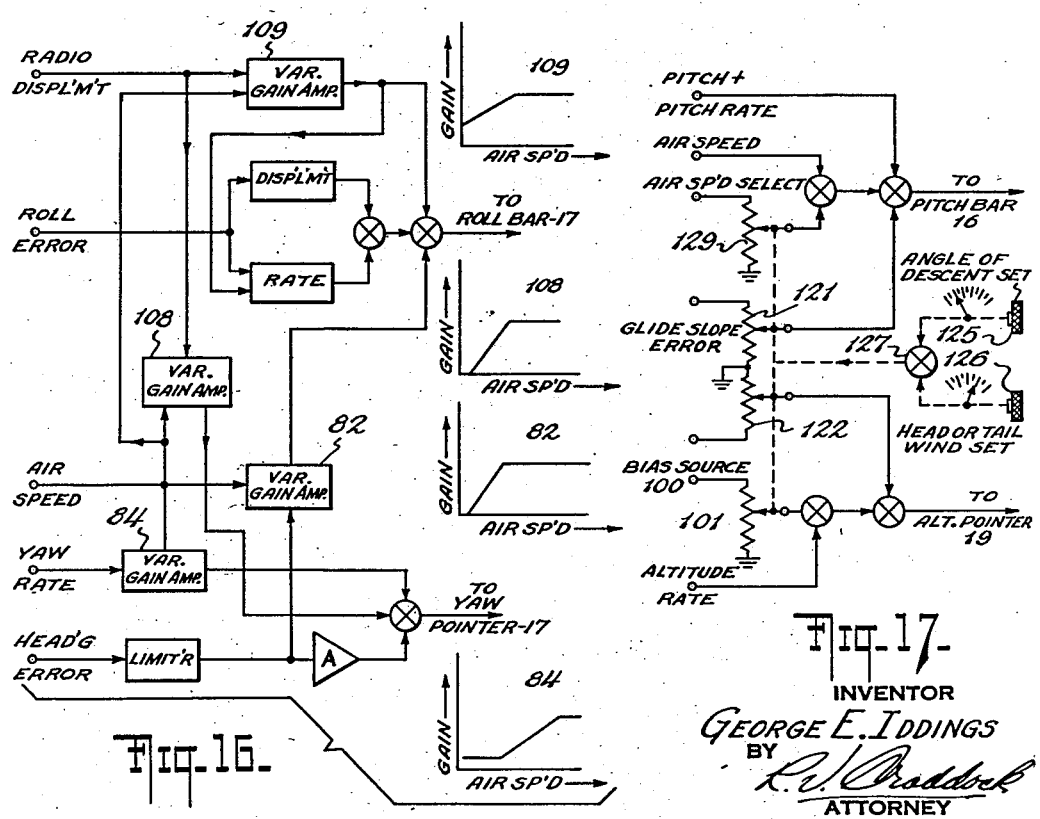

United States Patent Office 2,845,623
Patented July 29, 1958

2,845,623

AIRCRAFT NAVIGATION SYSTEM

George E. Iddings, Wantagh, N. Y., assignor to Sperry Rand Corporation, a corporation of Delaware Application January 3, 1956, Serial No. 557,720

42 Claims. (Cl. 343—107)

The present invention relates generally to aircraft control and navigation instrumentation. The invention is herein particularly applied to a control and navigational aid for manually piloted aircraft wherein the pilot is relieved of the need of scanning a number of independent flight instruments and interpreting the information supplied thereby and further is relieved of the need of anticipating the amount of control commanded by such interpretation, all of which require a great deal of experience and skill on the part of the pilot. However, it will be understood that this preferred embodiment serves only as an exemplary illustration of the principles of the present invention in its broader aspects. That is to say, the principles of the present invention may apply equally well to a system for automatically controlling the aircraft through suitable servo systems coupled to actuate the aircraft's control elements.

The present invention is based generally on the principles set forth in U. S. Patents Nos. 2,613,350 and 2,613,352, which are assigned to the same assignee as the present application, but further including novel improvements therein which are of a fundamental nature in instrumentation for aircraft capable of sustained flight from zero air speeds to relatively high air speeds, such as rotary wing aircraft or helicopters, the so-called "converti-planes," V. T. O. aircraft, and the like, these improvements resulting from the wide range of performance characteristics of such aircraft.

As in the above-noted patents, aircraft instrumentation for use in fixed wing aircraft fall generally into two main categories—those instruments which indicate the position of the craft with reference to a desired flight path and those which indicate craft flight attitude. However, due to the performance characteristics of aircraft of the helicopter type, further instrumentation is required for achieving stable, coordinated flight, such additional instrumentation including as an example, instrumentation indicative of craft air speed since craft air speed will affect the operation and performance of the aircraft when operated in accordance with information supplied by both of the above instrument categories. The craft stabilization and navigation system of the present invention combines and correlates, in addition to craft attitude, altitude, and flight path information, further information as to the air speed of the craft, this coordinated information being, in the illustrated embodiment, supplied as command signals to a pilot's indicator. This indicator comprises for example, a meter having relatively distinguishable bars and pointers thereon for indicating the amount of craft control in pitch and altitude, and in roll and yaw required to cause the craft to approach and thereafter maintain the desired flight path or plan, these bars and pointers being centered with respect to the face of the indicator not only when the craft is on the selected path or is flying according to the selected plan, but also when the craft is off, or has departed from, the selected path or plan, and the attitude, altitude and/or air speed of the craft is such that the craft will be returned to said path or flight plan when controlled in accordance with the control demands of the indicator.

It is, therefore, a primary object of the present invention to provide an improved stabilization and navigation system primarily for aircraft capable of sustained flight from substantially zero air speeds to relatively high air speeds, such as is encountered by helicopters.

Another object of the present invention is to provide apparatus by means of which an aircraft may be controlled to approach and maintain a desired flight path by separately or jointly controlling craft attitude in pitch, roll, yaw, and in craft altitude, in accordance with output control signals which are indicative of errors in said craft attitude and altitude, said control signals being the sum of a plurality of signals which are correlated and combined as functions of very wide ranges of aircraft flight characteristics, such as wide ranges of air speed, angles of descent, and so forth.

A further object of the present invention is to provide a system of the character set forth above wherein said output control signals are applied to signal responsive means which comprises an indicator having readily distinguishable bars and pointers actuated thereby and wherein the control signals supplied thereto are so correlated and combined that by maintaining the pointers zeroed or centered with respect to the instrument face the craft will be caused to approach and maintain a selected flight plan.

A further object of the present invention resides in the provision of a craft navigation system of the character set forth above wherein the flight path may be determined by craft attitude, altitude and air speed references only, by radio equipment carried in the craft and responsive to ground tracks defined by radio beams, and/or by computer devices carried by the aircraft for defining a preselected flight path.

A further object of the present invention is to provide an improved stabilization and navigation system primarily for rotary wing aircraft by means of which the maneuvers of the craft may be continuously coordinated for all air speeds ranging from zero or substantially zero air speed to the maximum air speed of the craft.

Another object is to provide an improved instrumentation for helicopters and the like aircraft by means of which the rate of turn of the craft may be controlled by controlling primarily the bank angle of the craft at high air speeds and by controlling primarily the rate of yaw of the aircraft at zero or substantially zero air speeds.

A still further object of the present invention resides in the provision of improved instrumentation for helicopter stabilization and navigation by means of which the helicopter may be controlled accurately to approach and thereafter maintain a glide slope radio beam, the angle of which relative to a landing runway may be varied or which may be large with respect to the ground, the various signals contributing to aircraft flight control command signals being correlated and combined as a function of the angle of descent or glide slope beam angle.

A further object of the invention is the provision of helicopter instrumentation of the latter character by means of which the helicopter may be controlled accurately to follow a selected glide slope beam by correlating and combining these various signals in accordance with the magnitude of head winds or tail winds encountered during a landing operation.

Other objects and advantages of the present invention not at this time particularly enumerated will become clearly apparent from the following detailed description of preferred embodiments thereof illustrated in the accompanying drawings, wherein:

Figs. 11 through 17 are block diagrams of various modifications of portions of the apparatus illustrated in Fig. 2.

In the following description of the present invention as applied to the stabilization and navigation of a helicopter, it will be assumed that the helicopter rotor is driven and maintained at a constant optimum R. P. M. through a suitable rotor R. P. M. control system.

Furthermore, in the following description of a preferred embodiment of the present invention it will be appreciated that the control system may be applied to helicopters having a configuration different from that illustrated in Fig. 1; for example, helicopters having tandem rotors, those having side-by-side rotors, and those of the ram-jet type. In any helicopter the same general control elements are employed, i. e., a control element for controlling pitch and roll attitude, one for controlling the yaw attitude, and another for controlling altitude, and the control system of the present invention may be employed for providing control commands indicative of required changes in any of the above control elements for causing the craft to achieve the selected flight plan.

Figure 1:
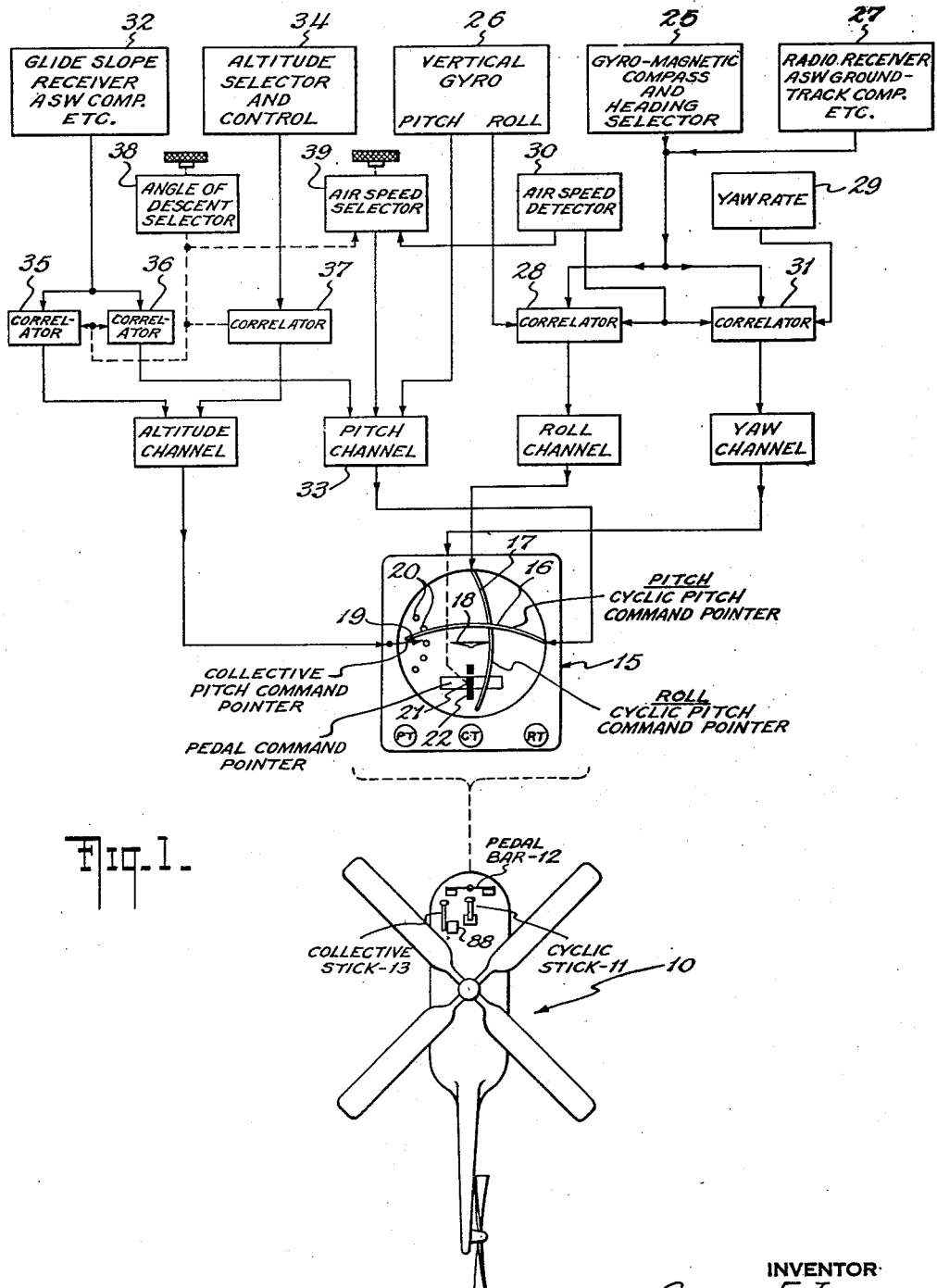
Fig. 1 is a simplified block diagram showing the general relationship of the various signals operating within the system which signals are combined and correlated to provide output control signals for actuating the various command pointers of a pilot's indicator.

Referring now to Fig. 1 there is illustrated a plan view of a typical helicopter 10, the stabilization and navigation of which are controlled by means of three primary manual control elements: pitch and roll attitudes are controlled by means of cyclic rotor blade pitch stick 11, yaw is controlled by anti-torque propeller pedal bar 12, and altitude is controlled by a collective rotor blade pitch stick 13. In turn, due to the peculiar characteristics of a helicopter, the cyclic pitch stick 11 also controls the fore and aft motion or air speed of the craft and also the lateral motion of the craft.

The indicator 15 of the present invention is generally the same as that illustrated in the above-noted patents wherein a normally horizontal bar 16 and a normally vertical bar 17 are moved relative to a central index 18 indicating the normally zero signal position of the indicator. However, the indicator of the present invention further includes a preferably short, normally horizontal pointer 19 which moves relative to the zero index 18 or if desired a separate index or series of indices 20 may be provided, in order to facilitate interpretation of the motion of pointer 19. In addition, a further normally vertical pointer 21 is provided which moves relative to the index 18. The pointer 21 may be identical to pointer 19, however in order to facilitate interpretation of the movement of pointer 21 and to clearly distinguish it from bar 17, pointer 21 is made in the form of a short dot-like element movable relative to an index or indices 22 and has the familiar appearance of a ball-bank indicator. Movement of vertical bar 17 to the right or left of index 18 is indicative of the amount and direction of right-left control of cyclic stick 11 required to produce a commanded craft roll angle. Likewise, movement of bar 16 above and below index 18 is indicative of the amount of movement of fore and aft cyclic stick 11 required to produce a commanded craft pitch attitude. Similarly, movement of pointer 19 above and below index 18 or indices 20 is indicative of a required up and down movement of collective pitch stick 13 required to produce a commanded change in craft altitude. Finally, movement of pointer 21 to the right or left of index 18 or indices 22 is indicative of the amount of right or left movement of pedal bar 12 required to produce a commanded change in craft yaw attitude.

As illustrated in Fig. 1, movement of the pointers is controlled in accordance with a plurality of signals derived from craft attitude and position references carried by said craft, these signals being combined and correlated as functions of existing dynamic flight characteristics of the craft. Thus, the vertical bar 17 is controlled in accordance with deviations in the heading of the craft from a selected heading as determined by gyromagnetic compass and heading selector 25, a signal corresponding to the roll angle of the craft as derived from suitable vertical gyro 26 and, if desired, a signal corresponding to the displacement of said craft from a predetermined ground track provided by means such as a navigation radio receiver, a ground track computer and/or the like, indicated generally at 27. These roll command signals are combined and correlated at 28 as a function of craft air speed as determined by a suitable air speed detector 29 and air speed selector 39. Pointer 21 by means of which the yaw attitude of the craft may be controlled, is deflected in accordance with signals corresponding to the deviations in the selected heading determined by gyromagnetic compass 25 and a signal corresponding to the rate of yaw of said aircraft as determined by the yaw rate sensing device 30 and, if desired, in accordance with a signal from the radio receiver or track computer 27, these signals also being correlated and combined as at 31 as a function of craft air speed determined by detector 29 and selector 39.

Movement of horizontal bar 16 is controlled in accordance with a pitch attitude signal derived from a vertical gyro 26 and a signal corresponding to the displacement of said craft from a predetermined track such as determined by a glide slope radio receiver or track computer 32, these signals being combined and correlated as at 33 and 36 as a function of craft air speed and the angle of descent determined by the setting of an angle of descent selector 38.

Movement of pointer 19 is controlled in accordance with signals derived from an altitude control device 34 and receiver or computer 32. These signals are combined and correlated as at 35 and 37 as functions of craft air speed and craft angle of descent determined by the setting of angle of descent selector 38.

As stated above, deflections of the bars and pointers of indicator 15 are indicative of changes in craft attitude, altitude, and air speed required to cause the craft to asymptotically approach and thereafter maintain the desired flight path or plan. Such a flight path or plan is selected by the pilot through a suitable selector switch (not shown) which may be of the character set forth in the above-noted Patent No. 2,613,352. However, in order to take advantage of the characteristics of the helicopter additional flight plans may be selected, these being provided by means of angle of descent selector 38 and air speed selector 39 to be hereinafter more fully described in connection with Fig. 2.

Figure 2:
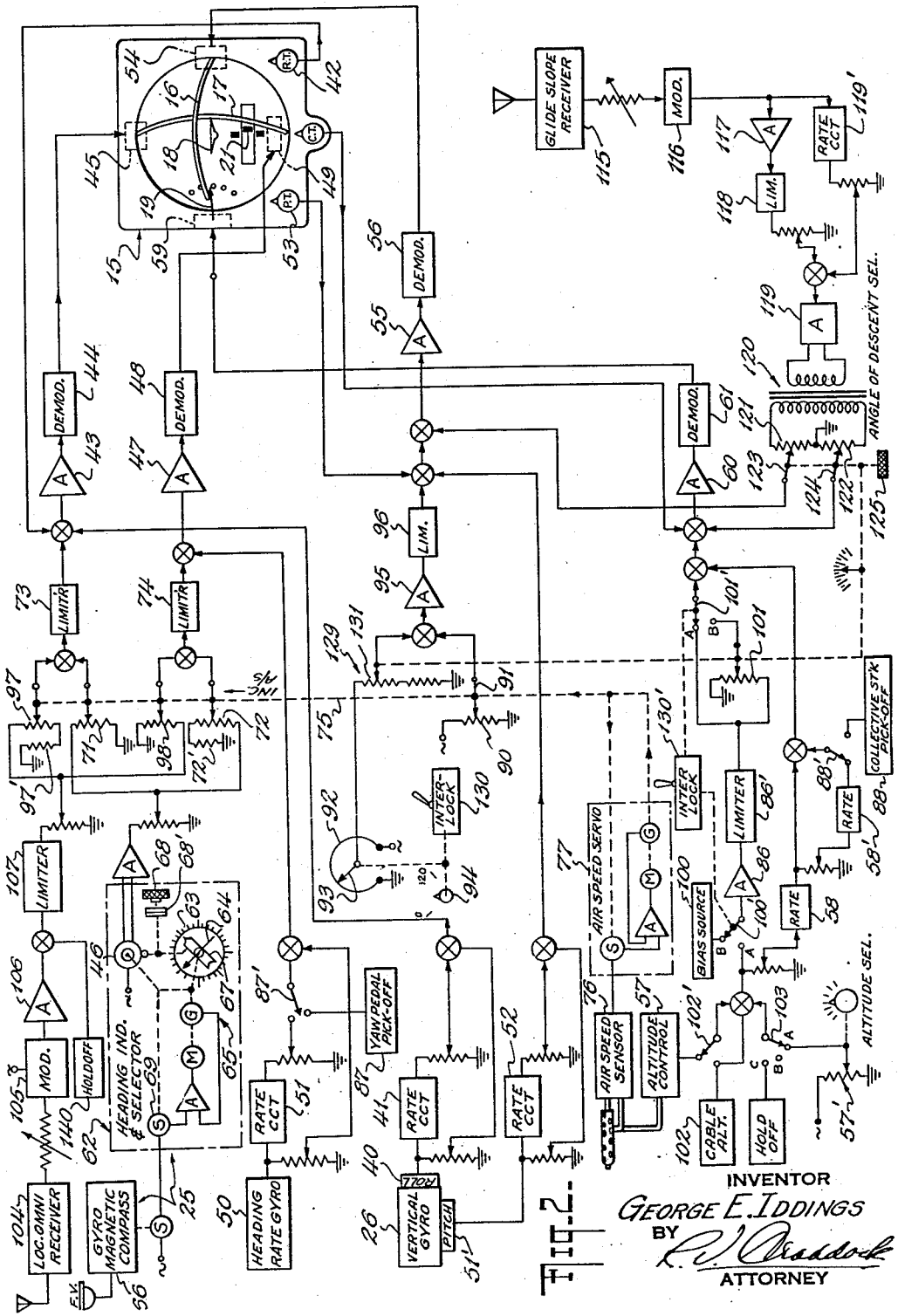
Fig. 2 is a detailed block diagram of a preferred embodiment of the system of the present invention.

Referring now to Fig. 2, roll stabilization of the aircraft may be controlled by adjusting cyclic pitch stick 11 to maintain the vertical bar 17 coincident with index 18. For this purpose the vertical gyro 26 provides a roll displacement control signal from a suitable pick-off 40 mounted on the roll axis thereof. This roll displacement signal together with the rate of change thereof provided by a rate circuit 41 is combined with a roll trim signal provided by a suitable trim adjusting device 42 conveniently located on the indicator 15. The resultant signal is supplied to a suitable amplifier 43 and demodulator 44, the output of which energizes the vertical bar moving means 45. The trim signal, which may be derived from a potentiometer, for example, is provided for cancelling residual errors due to vertical gyro mounting errors and for compensating for shifting of craft load distributions. The heading or yaw stabilization of the aircraft may be controlled in accordance with deflections of the yaw pointer 21 by so controlling the craft's yaw attitude that this pointer is maintained centered. For craft stabilization about the yaw axis a gyromagnetic compass 66 and heading selector 25 is provided for supplying an output signal from synchro 46 corresponding to deviations in the heading of the craft from a selected heading. This signal, together with a signal proportional to the yaw rate, and yaw acceleration of the aircraft are supplied to a suitable amplifier 47 and demodulator 48, the output of which applied to a suitable pointer actuating means 49. The yaw rate signal is generated by means responsive to the rate of change of craft heading such as a heading rate gyro 50. As above, a signal proportional to the rate of change of said yaw rate signal, or yaw acceleration, is combined with the yaw rate signal before being combined with the heading displacement signal. Such a yaw acceleration signal may be, for example, provided by passing the yaw rate signal through a suitable rate circuit 51.

Pitch stabilization of the aircraft may be controlled by controlling the cyclic pitch stick in a manner such as to maintain horizontal bar 16 normally coincident with the index 18. Vertical gyro 26 supplies a pitch displacement signal corresponding to the pitch attitude of the craft as determined by a suitable pick-off 51' mounted on the pitch axis of the vertical gyro. This displacement signal together with the rate of change thereof provided by rate circuit 52 is combined with a pitch trim signal supplied by a suitable trim adjusting device 53 and is supplied to the horizontal bar moving means 54 through suitable amplifier 55 and demodulator 56. The pitch trim signal which, like the roll trim signal, may be provided by a suitable potentiometer for the same reasons set forth above in regard to the roll trim signal.

To stabilize the aircraft about a selected altitude the pilot adjusts the collective pitch stick in a manner to maintain the horizontal pointer 19 in its zeroed position. For this purpose a displacement signal corresponding to deviations from a preselected altitude is provided by a suitable altitude control device 57, which displacement signal is suitably amplified and limited as at 86, 86' and together with the rate of change thereof, supplied by suitable rate circuit 58, is supplied to the horizontal pointer moving means 59 through suitable amplifier 60 and demodulator 61. As in the yaw channel, an altitude acceleration signal is provided by taking the derivative of the rate signal provided by rate circuit 58 as by means of a second rate circuit 58' the output of which is combined with the displacement and rate signals before application to the pointer moving means 59. All of the pointer moving means 45, 49, 54 and 59 may be any suitable type of signal responsive means for producing a mechanical movement or pointer displacement proportional to the magnitude and direction of electrical current applied thereto, such as for example D. C. meter movements.

Furthermore, all of the rate circuits described above may be substantially identical and may be of any of a number of conventional types wherein the output thereof is proportional to the rate of change of the input signal applied thereto.

The function of the rate signals in the pitch and roll channels it to produce a movement of the bars 16 and 17 such that the pilot in following the bar movements with the cyclic pitch controller, produces initially a roll and/or pitch rate of the craft. Since in a helicopter rates of movements about its primary axes build up rapidly, the rate signals to the indicating bars will be substantially equal to the stick displacement and therefore the bar movement will indicate to the pilot not only the direction of the error but also how much stock control is required to reduce the error to zero. However, the situation is different as far as the yaw and altitude pointer 21 and 19 are concerned due to the response characteristic of a helicopter. In such aircraft, the response thereof to a deflection of the pedal bar 12 is relatively slow; that is, there is an appreciable lag in the yaw motion of the craft upon deflection of the pedal bar. This lag in the response in the aircraft is due to the fact that a displacement of the pedal bar 12 produces a change in the pitch of the blades of the anti-torque propeller, the change in the pitch angle of the blades resulting in a relatively long duration yaw acceleration. It has been found that the displacement of the pedal bar 12 is substantially proportional to this yaw acceleration rather than a rate as in the case of roll and pitch. Therefore, in order to indicate to the pilot how much or to what extent the pedal bar should be displaced, a signal proportional to the yaw acceleration, i. e., the output of rate circuit 51, is supplied to pointer 21. The above arrangement eliminates the necessity for the pilot to anticipate the extent or magnitude of displacement of rudder pedal 12 required to produce a desired yaw rate of the aircraft. The same is true in regard to the altitude control of a helicopter inasmuch as the altitude is controlled by changing the collective pitch of the blades of the helicopter sustaining rotor. As with the pedal bar it has been found that the altitude acceleration of the craft is substantially proportional to the displacement of the collective pitch stick 13 and again in order to eliminate the necessity for the pilot to anticipate the response of craft movement to a collective pitch displacement, a signal proportional to altitude acceleration is supplied, by means of rate circuit 58', to horizontal pointer 19.

Inasmuch as the displacement of the pedal bar or yaw pedal 12 is substantially proportional to the yaw acceleration of the craft, a signal corresponding to the pedal displacement may be substituted for the signal proportional to the actual craft acceleration provided by rate circuit 51. The use of such a pedal displacement signal is illustrtaed in Fig. 2 and may be generated by means of a suitable pick-off 87 such as, for example, a potentiometer or synchro device mounted on and actuated by the yaw pedals 12. The signal supplied thereby may be combined with the heading rate gyro signal through a suitable switch 87'. It will be understood that if such a pedal pick-off is employed, the signal generated thereby will be wiped out in time by the rate error signal. Similarly, in the altitude channel since the displacement of the collective pitch stick is substantially proportional to the altitude acceleration, a signal corresponding to this displacement may be substituted for the altitude acceleration signal from rate circuit 58' in Fig. 2. Such a collective stick displacement signal may be provided by a suitable signal generating device 88 such as a potentiometer or synchro positioned by the collective pitch stick. The signal generated thereby may be combined with the altitude displacement signal as by means of a suitable switch 88'.

The apparatus so far described will provide easily interpretable information to the pilot which will render the heretofore extremely tedious task of maintaining flight stability of a helicopter a very simple one.

The helicopter may be easily and accurately maneuvered or navigated by simply moving the craft control elements 11, 12 and 13 to maintain the bars and pointers of the indicator 15 zeroed, the signals supplied thereto under such conditions being modified, combined, and correlated in accordance with maneuver commands and/or navigation commands selected by the pilot. A heading selector 62 coupled with a gyromagnetic compass 66 provides the heading command or maneuver signal. Heading selector 62 may be substantially identical to that shown in the above-noted Patent No. 2,613,352 and comprises generally a compass card 63 and associated compass pointer 64, the latter being driven through a conventional servo follow-up loop 65 from the gyromagnetic compass 66. A heading selector pointer 67 mounted coaxially with pointer 64 is provided for indicating the magnitude of a desired heading change in degrees. Heading selector pointer 67 is positioned by means of a suitable selector knob 68, which knob is connected to drive pointer 67 relative to pointer 64. This relative motion similarly displaces the stator of heading selector synchro 46 relative to its rotor, the position of the latter being determined by the heading of the craft through compass follow-up loop 65. After a desired heading has been set, the stator of synchro 46 is clutched to the instrument case by means of a conventional friction clutch 68'. Thus, zero induced voltage will occur in the rotor winding of heading selector synchro 46 only when the craft is at the selected heading; otherwise an output signal voltage from heading selector synchro 46 will be produced proportional to the error in degrees between the present craft heading and the desired or selected heading.

In accordance with the present invention, the heading error or heading deviation signal from synchro 46 is simultaneously supplied to a pair of variable impedance devices such as across the windings of a pair of variable potentiometers 71 and 72. Limiters 73 and 74 are provided in the output of potentiometers 71 and 72 for limiting the maximum value of the heading deviation signal supplied to the roll and yaw pointers 17 and 21 to thereby limit the rate of turn or rate of yaw of the craft as will be described. The output of potentiometers 71, 72, are combined with the roll signal supplied by vertical gyro 26 and the heading rate signal supplied by heading rate gyro 50, respectively, the relative magnitudes of the heading signals supplied by potentiometer 71, 72 being varied as a function of the air speed of the craft as by means of a mechanical coupling 75 actuated by air speed servo 77 now to be described.

The air speed of the craft is determined by means of a conventional air speed sensing device 76 adapted to produce an output signal corresponding to the air speed of the craft, this signal being followed-up by means of a conventional air speed follow-up servo loop 77 which drives in a direction and to an amount to continually reduce the air speed error signal to zero. Thus, the position of the output shaft 75 of the air speed servo 77 is continually maintained equal to the instantaneous air speed of the aircraft.

As stated, the output of potentiometer 71 will provide the means for continuously controlling the signal sensitivities in the control channel for roll pointer 17 whereby to command a bank angle of the craft corresponding to the heading error thereof from a selected heading which will be a function of craft air speed and likewise the output of potentiometer 72 will vary the signal ratio which controls yaw pointer channel to call for a rate of yaw of the craft which will also be a function of craft air speed. Thus, the relative movement of heading pointer 21 and roll bar 17 will be correlated in a manner to produce coordinated turns regardless of craft air speed when the pilot controls the aircraft control elements so as to continually maintain these pointers zeroed or centered with respect to the face of the indicator.

Figure 3:
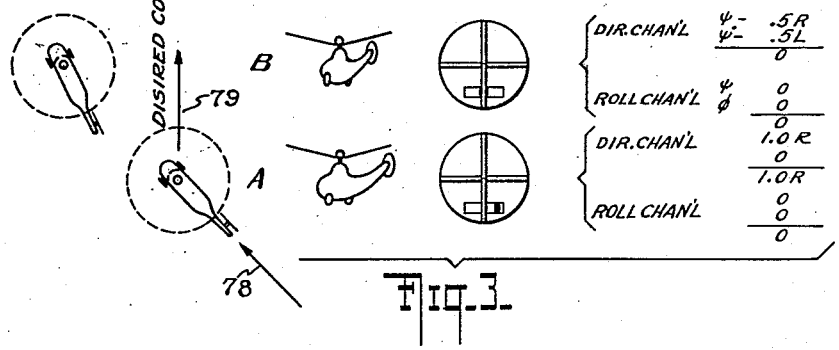
Figs. 3, 4 and 5 are diagrams illustrating the principles of the present invention wherein an aircraft of the helicopter type is attaining a selected heading under various air speed conditions.
Figure 4:
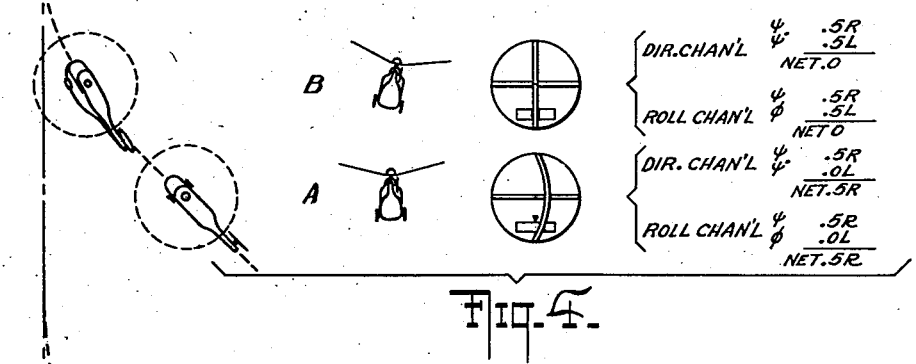
Figure 5:
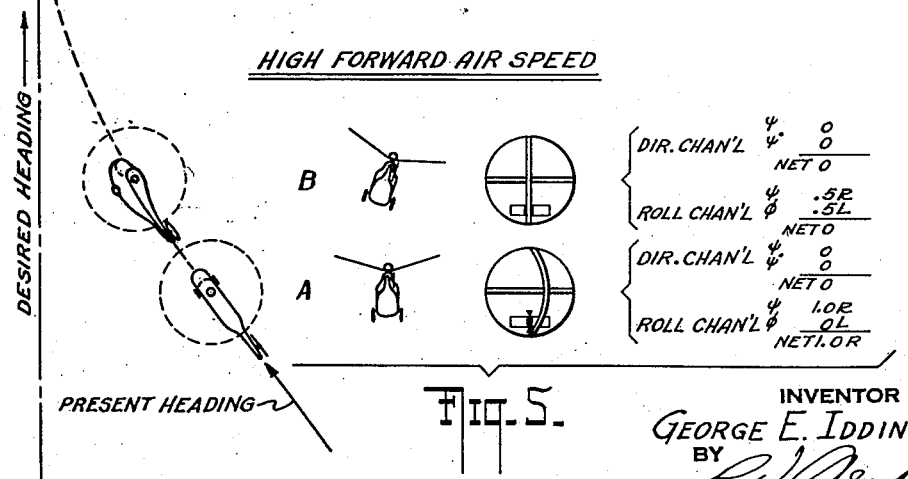

The operation of the apparatus thus far described may readily be understood by referring to Figs. 3, 4 and 5 wherein there is schematically illustrated an aircraft of the helicopter type attaining a selected heading under various air speed conditions, i. e., under a condition of zero air speed, low forward air speed, and under high forward air speed conditions. Assume that the craft is flying in a direction illustrated by arrow 78 in Fig. 3 and it is desired to fly in the direction of arrow 79. The pilot adjusts heading selector pointer 67 to the bearing of the desired heading thus generating a heading error signal at the output of heading selector synchro 46. This signal is applied across the windings of potentiometers 71 and 72. Since the craft is flying at zero forward air speed, air speed shaft 75 has positioned the wiper of potentiometer 71 substantially to its grounded or zero output position thereby supplying substantially zero heading error signal to amplifier 43 and to roll pointer 17. On the other hand, the wiper of potentiometer 72 has been positioned to a point on the potentiometer winding such that the same offers substantially zero impedance to the heading error signal and, therefore, substantially all of this signal is supplied through amplifier 47 to the yaw pointer 21 producing a displacement thereof corresponding to the magnitude of the heading error. Responding to the command of the pointer 21, the pilot operates the pedal bar of the helicopter in the same sense as the pointer deflection thereby changing the pitch of the anti-torque propeller and thus producing a control moment about the craft yaw axis. The resulting craft yaw rate will be detected by yaw rate gyro 50, the signal output of which is differentiated as at 51 which, as stated, is proportional to the yaw acceleration of the craft. This yaw acceleration signal is degeneratively combined with the heading error signal and when the magnitude of this signal is equal to the heading error signal the pointer 21 will move to its zero position thus telling the pilot to stop pedal bar movement. As the acceleration develops into a rate of yaw the rate of law signal will wash out or replace the acceleration signal and the pointer 21 will remain zeroed. The function of limiter 74 is to limit the maximum value that the heading error signal may attain, which therefore limits the rate of yaw of the aircraft. Thus, no matter how large the heading error is commanded, the rate of turn will not exceed a desired value. As the craft approaches the selected heading the output of heading selector synchro 46 will decrease thereby causing pointer 21 to be deflected in the opposite direction and in order to maintain the pointer 21 zeroed the pilot must reduce his rate of yaw, the acceleration signal again operating in the opposite sense to eliminate any necessity for the pilot to anticipate the magnitude of pedal deflection required to so reduce the craft's yaw rate. When the desired heading has been attained, the heading error signal goes to zero and the pilot correspondingly reduces the heading rate of the craft to zero in accordance with the dictates of the pointer 21.

Under low or moderate air speed conditions it will be readily apparent that the limited heading error signal is supplied to both the roll bar 17 and the yaw pointer 21, the relative magnitude thereof being determined by predetermined ratios thereof required for coordinated flight at these air speeds. As a matter of fact, the resistance characteristics of potentiometers 71 and 72 will be determined by such calculated, predetermined ratios. Thus, at these low or medium air speeds, the pilot will roll the aircraft until the roll angle of the craft is such that the roll signal from vertical gyro 26 just cancels the heading error output from potentiometer 71 and simultaneously he will yaw the aircraft until the yaw rate signal from rate gyro 50 just cancels the heading error signal supplied by potentiometer 72 resulting in a coordinated maneuver to the selected heading (see Fig. 4).

At high forward air speeds the helicopter handles in a manner substantially the same as fixed wing aircraft. Under this condition substantially all of the heading error signal is supplied to actuate roll pointer 17 commanding the pilot to bank the craft to a bank angle having a value such that the signal from the vertical gyro 26 just cancels the heading error signal of potentiometer 71. Damping of the heading change will be continuously maintained by means of the yaw rate gyro feeding a yaw rate signal to pointer 21. Although the wiper of potentiometer 72 is positioned to impede substantially all of the heading error signal in a yaw channel a predetermined small amount of heading displacement signal is continuously supplied to the yaw channel at high air speeds by means of a biasing resistor 72' between one end of potentiometer winding 72 and ground whereby to provide a positive heading reference at high air speed conditions. This small amount of heading signal further provides a means for maintaining the turn maneuver coordinated during the heading change.

In accordance with one of the primary objects of the present invention means have been provided in Fig. 2 by which craft maneuvers are continuously coordinated for all air speeds from zero to some maximum air speed. In Figs. 11 through 15 there are illustrated several modifications of the present invention by means of which this object may be achieved. In essence these modifications provided means for varying the rate of turn of the craft as a function of the air speed thereof. For example, in Fig. 11 a signal corresponding to the roll angle of the craft and a signal corresponding to the heading error thereof are combined algebraically and supplied to actuate the roll pointer 17 which, as described above is indicative of the amount of attitude control in roll required to produce a change in the craft heading at a predetermined rate. Also, a signal corresponding to the yaw rate of the craft and a signal corresponding to the heading error thereof are algebraically combined and supplied to actuate the pointer 21, the deflection thereof being indicative of a required rate of turn in yaw of the craft. In this modification, however, the heading error-to-bank angle signal ratio and the heading error-to-yaw rate signal ratio are simultaneously varied as a function of air speed by respectively varying the magnitude of the bank angle signal supplied to pointer 17 and the magnitude of the yaw rate signal supplied to the point 21, the heading signal being left substantially unmodified except for limiting. The roll angle signal supplied by vertical gyro 26 is applied to the roll command pointer 17 through a variable gain amplifier 80 and the yaw rate signal supplied by yaw rate gyro 50 is applied to yaw command pointer 21 through a variable gain amplifier 81. The gain of roll displacement amplifier 80 is varied inversely with air speed, that is, the amplifier has a relative low gain at high air speeds and vice versa; and the yaw rate amplifier gain is varied directly as air speed, that is, at low air speeds the amplifier gain is substantially zero and vice versa. One advantage of this modification is the elimination of an air speed follow-up servo loop since the relative gains of aplifiers 80 and 81 may be varied by means of an electrical voltage proportional to the air speed of the craft as derived directly from an air speed sensor in a conventional manner, such as by varying the control grid bias of an amplifying valve of the amplifier or by varying the screen grid voltage thereof, for example.

Figure 11:
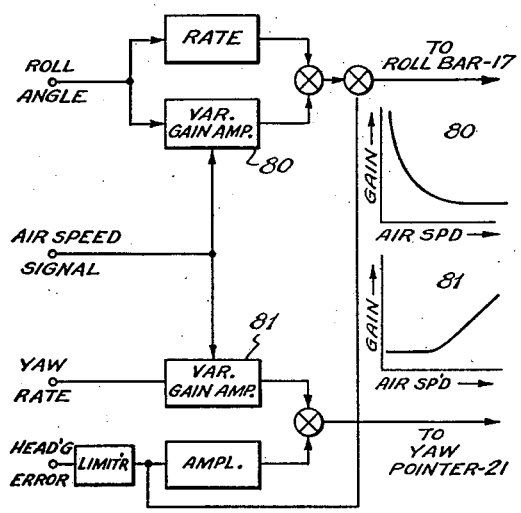
Figure 12:
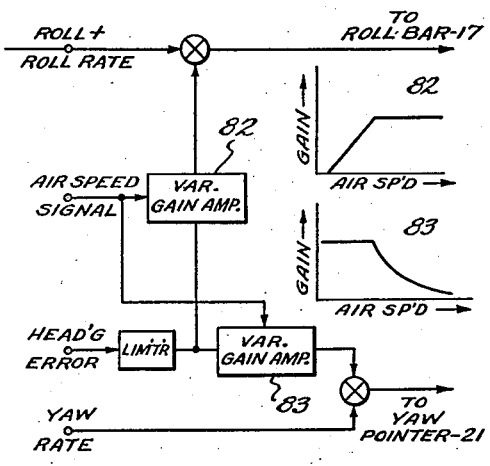
Figure 13:
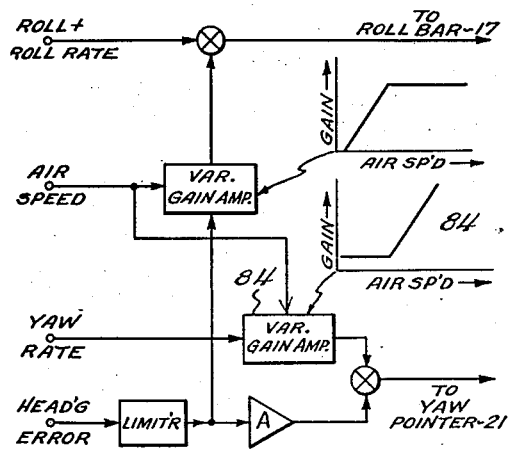

In the modification illustrated in Fig. 12 the rate of turn of the craft is made variable as a function of air speed by means similar to that of Fig. 11 except that in Fig. 12 the heading error signal is supplied to the roll pointer through a variable gain amplifier 82, the gain of which is varied directly as a function of air speed, that is, at high air speeds the gain of amplifier 82 is maximum and vice versa. At the same time, however, the heading error supplied to yaw pointer 21 is varied inversely with air speed through a variable gain amplifier 83. Thus, at high air speeds the rate of turn of the craft is obtained primarily by banking of the craft in response to a deflection of the roll pointer 17 requiring large roll angle signal to cancel the heading error signal, very low values of heading signal being supplied to yaw pointer 21 in order that lower yaw rates can cancel the heading error signal. However, at low air speeds substantially no heading signal is supplied to the roll pointer channel while large heading signals are supplied to the yaw pointer channel thus requiring no roll and controlling turns primarily by yaw rate. In Fig. 13 the roll pointer channel is controlled substantially identically as in Fig. 12 but in this modification the yaw rate signal supplied by rate gyro 50 is increased as by a variable gain amplifier 84 directly with air speed. Thus, for increasing air speeds more and more yaw rate signal is combined with the heading error signal resulting in a lower and lower net yaw rate signal output to cancel heading signal, thus slowing down the turn demanded.

Figure 14:
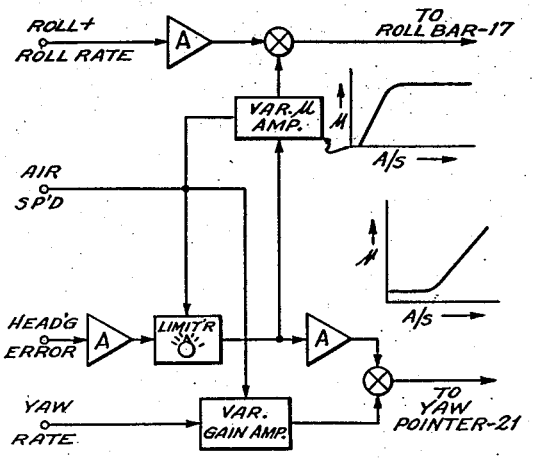

The modification of Fig. 14 is similar to that shown in Fig. 11 except that in Fig. 14 the limits imposed on the heading signal are varied as a function of air speed to thereby vary the bank angle in accordance with air speed whereby the maximum rate of turn is likewise controlled in accordance with air speed. If the limits are varied inversely with air speed, the bank angle at low air speeds will be high with a corresponding high turn rate and the opposite will be true at higher air speeds. The variable gain amplifiers of Fig. 14 control the heading-to-roll ratio and the heading-to-heading rate ratios as above.

In the modification illustrated in Fig. 15 the magnitude of the yaw rate signal generating means itself is varied as a function of air speed resulting in a control signal to the yaw pointer 21 which is substantially identical to that supplied in Fig. 13. In Fig. 15 the sensitivity of the yaw rate gyro is varied by varying the energization of the pick-off 85 thereof. This pick-off is illustrated as an E-type pick-off of conventional form in which the energization of the excitation winding, or center leg winding is varied as a function of air speed which thereby varies the current unbalance in the pick-up windings mounted on the outer legs thereof. Therefore, the signal voltage produced thereby is varied in accordance with craft air speed. Of course, other means for varying the sensitivity of the output of rate gyro 50 may be provided such as, for example, by varying the speed of rotation or angular momentum of the gyro rotor as a function of craft air speed.

Referring again to Fig. 2, craft maneuvers in pitch and altitude are controlled by controlling the helicopter rotor cyclic pitch stick in accordance with deflections of the pitch bar 16 and by controlling the collective pitch stick in accordance with deflections of the pointer 19. In a helicopter, the primary function of pitch attitude is to control craft air speed that is, changes in pitch attitude result in changes in air speed either forward or backward. The latter control is rarely used except under critical hovering conditions and the apparatus of the present invention may be used under such maneuvering conditions. In Fig. 2 means have been provided for selecting a desired air speed, such means including an air speed transmitter potentiometer 90, the wiper arm 91 thereof being positioned by shaft 75 and hence in accordance with existing craft air speed, the output of potentiometer 90 therefore is a voltage proportional to existing air speed. An air speed selector potentiometer 92 is provided for selecting a desired air speed. Thus, the wiper 93 of potentiometer 92, excited from a suitable source fixed voltage, is positioned by a suitably calibrated knob 94 in accordance with a desired air speed and the voltage output of potentiometer 92 is therefore proportional to a desired air speed. This voltage is compared with the voltage output of potentiometer 90 and any difference therebetween represents a signal voltage proportional to deviations in the existing craft speed from that selected. This voltage is amplified in a suitable amplifier 95 and limited by means of limiter 96 and then algebraically combined with a signal corresponding to the pitch attitude of the craft from vertical gyro 26. The algebraic difference of these signals is supplied as an output control signal to pitch bar 16 of indicator 15.

The operation of the pitch channel of the control system of the present invention is similar to that of the roll channel. If, for example, the aircraft is flying at some selected cruising air speed and it is desired for example to increase the cruising air speed, knob 94 is rotated by the pilot to the air speed desired thereby supplying an air speed error signal to amplifier 95 and producing an upward deflection of bar 16. Responding to this command, the pilot pushes forward on the cyclic pitch control stick, which motion produces a pitch signal from vertical gyro 26. Pitching of the aircraft forwardly increases its air speed and as the desired or selected increased air speed is attained the air speed error signal goes to zero as the output voltage from potentiometer 90 increases. The limiter 96 limits the maximum value of the air speed error signal to a predetermined value to thereby limit the amount of pitch control that can be applied by the pilot to zero this limited signal. In effect the air speed reference potentiometers 90 and 92 have established a new pitch attitude reference in the aircraft. Of course, the craft will still be stabilized at this new attitude reference by means of vertical gyro 26.

Altitude maneuvers of the helicopter are accomplished in the present invention by controlling the operation of the collective pitch control element 13 in accordance with output control signals supplied to the pointer 19 of the indicator 15. As previously mentioned, the craft may be controlled to maintain a desired or selected altitude by supplying a signal proportional to the displacement of the aircraft from the selected altitude, which signal is provided by an altitude selector 57' in a manner similar to the air speed selector. The altitude error signal thus provided is differentiated by means of rate circuit 58 to provide a damping function and furthermore may be differentiated again as by rate circuit 58' to provide a rate anticipation or acceleration signal, the latter derivatives being combined with the displacement signal and the algebraic sum thereof being employed to control the deflection of pointer 19 as described above. In a similar manner the craft may be controlled so as to ascend or descend at a predetermined rate. For this purpose a source of bias voltage 100 is substituted, through switch 100', for the altitude error signal from 57, 57', the magnitude of this bias signal being suitably adjusted by means of an angle of descent, or altitude rate, selector 125 and potentiometer 101. This bias signal produces a deflection of pointer 19 which can only be zeroed by the pilot moving his collective pitch stick. The resulting craft rate of descent or ascent produces corresponding signal from rate circuit 58 which will cancel the bias signal. When the two signals are zeroed, i. e., indicator pointer 19 is zeroed, the craft will be descending at the desired rate. When the craft approaches the selected altitude, which the pilot may select while descending or ascending as just described (with switch 103 in the B position), the pilot throws switch 103 and 101 to the A position. In all likelihood the altitude error signal will be in limit, i. e. will be limited by limiter 86'. However, when the altitude error signal comes out of limit, the resulting diminishing displacement signal together with the altitude rate signal will provide a flared or asymptotic flight path of the craft to the selected altitude. Another means for controlling the altitude of the craft, especially during a hovering maneuver, is by means of a cable altitude control 102 its signal being supplied to the system through switch 102' (preferably with switch 103 in position B). In this case it may be desirable to hover the aircraft a predetermined distance above the earth's surface, the distance being determined by a cable or lanyard having one end thereof substantially fixed to the ground and the other end thereof passing over a suitable roller, the roller in turn rotating a synchro pick-off or potentiometer, the magnitude of rotation thereof in turn being a measure of deviations in the roller-to-ground distance.

As stated above, the apparatus of the present invention may be employed for enabling the pilot to maneuver the helicopter so as to approach and maintain a predetermined ground track, such as that provided by radio navigation facilities such as an I. L. S. system, V. O. R. or omni-systems and the like or by means of a computer or the like which is preset to supply guidance signals designed specifically to take advantage of the peculiar flight characteristics of the helicopter. In the following description, however, and as a typical example, reference will be made particularly to an I. L. S. system. The desired ground track guidance information may be inserted into the control system by means of suitable selector switches, not shown but which may be of the type shown in the above Kellogg patent.

The roll and yaw channels of the apparatus are substantially identical in the beam guidance mode as in the navigation mode without beam guidance. However, in the former mode an additional signal corresponding to the displacement of the aircraft from the ground track is provided by means of a radio receiver such as, for example, a localizer receiver 104 which signal is modulated, amplified and limited as at 105, 106 and 107 respectively. This limited radio displacement signal is supplied as an excitation voltage to a pair of correlation potentiometers 97 and 98 the outputs thereof being combined with the heading displacement signal supplied by heading selector synchro 46 (the heading selector being set to the bearing of the radio beam) which has been correlated in potentiometers 71 and 72. The algebraic sum of the output signals of correlating potentiometers 71 and 97 and potentiometers 72 and 98 being again limited by means of limiters 73 and 74 respectively and applied to roll bar 17 and yaw pointer 19 respectively. As in the above-noted Patent No. 2,613,352, the radio displacement limiter 107 serves to limit the angle of approach of the aircraft toward the ground track. Likewise, the combined radio displacement and heading error signal from correlation potentiometers 71 and 97 is also limited as at 73 whereby to limit the maximum value of the combined signal which is to be cancelled by the roll signal from vertical gyro 26. Similarly the combined radio displacement and heading signal from correlating potentiometers 72 and 98 are also limited as at 74 whereby to limit the maximum value of the combined signal which is to be cancelled by the yaw rate signal supplied by rate gyro 50. The ratio of the heading and localizer-to-roll signals and the ratio of the heading and localizer-to-yaw rate signals is varied continuously as a function of the air speed of the craft, as described above. It will be noted, however, that at zero or substantially zero air speed the localizer radio displacement signal supplied in the roll bar channel can never go completely to a zero value due to the biasing resistor 97' connecting one end of potentiometer 97 to ground. Thus, in accordance with one of the objects of the present invention, at zero or substantially zero air speed, with the craft displaced from the radio beam, the displacement signal will be supplied to the roll bar channel to command a bank angle and in a helicopter, such bank angle at zero air speed will produce a lateral movement of the craft, as will be further described.

Figure 6:
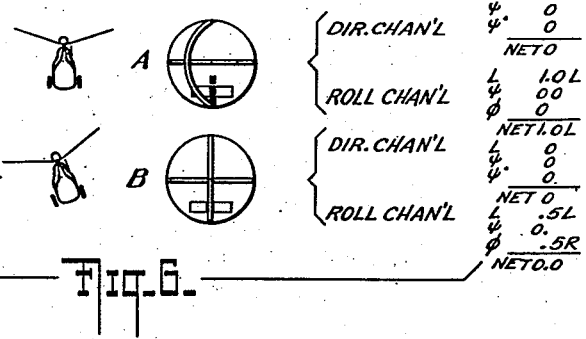
Figs. 6, 7 and 8 are diagrams illustrating the use of the present invention wherein the craft is attaining a localizer beam of an instrument landing system under various air speed conditions.
Figure 7:
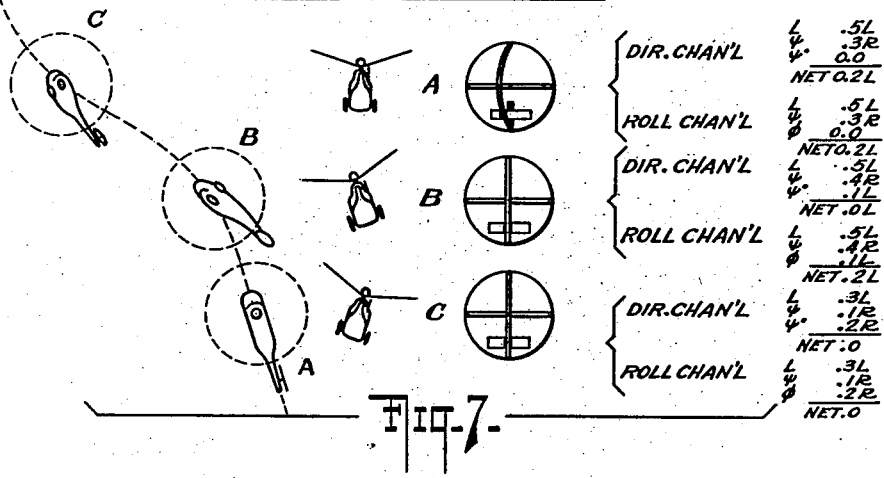
Figure 8:
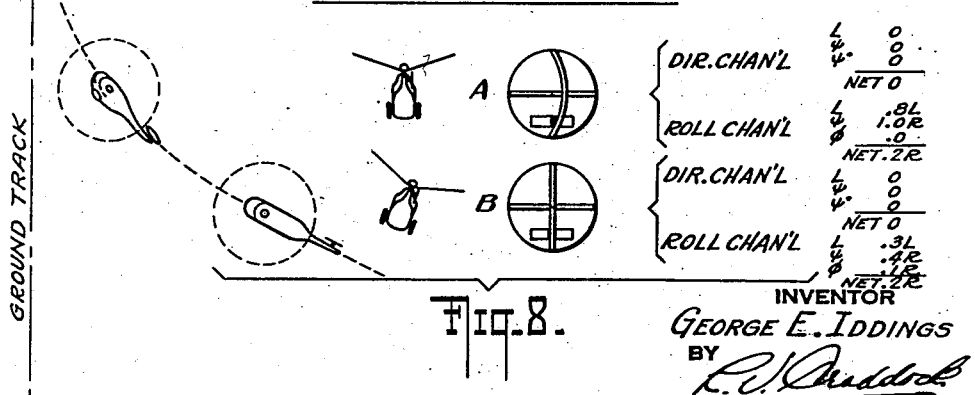

The operation of the apparatus of the system of the present invention when it is desired to approach and thereafter maintain a radio ground track, such as the localizeer beam of an instrument landing system, may readily be understood by referring to Figs. 6, 7, and 8. In Fig. 8 under high craft velocity conditions the correlating potentiometers 71, 97 and 72, 98 are adjusted by means of air speed servo 77 and shaft 75 to supply substantially all of the heading signal and all of the localizer signal to the roll bar channel, while these signals are attenuated or substantially removed from the yaw pointer channel. Hence, under these conditions, the operation of the instrument of the present invention is substantially identical to the operation of the instrument disclosed in the above-noted Patent No. 2,613,352. Thus, the quickest and easiest way to correct a radio displacement signal is to change the heading of the aircraft. In this channel the radio displacement signal initially requires a roll signal for cancellation, i. e., for a zero deflection of roll bar 17 the bank angle signal first cancels the radio displacement error signal, the bank angle signal being limited by limiter 73. As a heading error is developed as a result of banking, the heading error signal from synchro 46 tends to replace the roll signal to indicate to the pilot the requirement for less roll signal to cancel the radio displacement signal and, of course, when the heading error is equal to the radio displacement error the craft is flying straight and level toward the radio track at an angle determined by the maximum allowable amplitude of the radio displacement signal through limiter 107. At high forward air speeds the heading rate signal in the yaw channel continuously serves as a heading change damping signal.

Under low forward air speed conditions, an example of which is illustrated in Fig. 7, the quickest and easiest method to correct for a radio displacement signal is simultaneously to change the heading of the aircraft through the yaw control element or pedal bar 12 and the bank angle of the craft through roll control element or cyclic stick 11. This is accomplished by means of the correlating potentiometers 71, 97 and 72, 98, wherein the radio displacement signal and heading signals are applied to both the yaw and roll channels.

Beam coupling under zero or substantially zero air speed conditions with the apparatus illustrated in Fig. 2 is illustrated by the diagram of Fig. 6. Assume that the helicopter is laterally displaced from the beam as at A. Although the localizer signal has been partially attenuated through potentiometer 97 by operation of the air speed servo 77 and the shaft 75 and also that the heading signal has been attenuated through potentiometer 71, a predetermined amount of localizer signal is still supplied to the roll channel due to biasing resistor 97' on potentiometer 97. Alternatively, potentiometer 97 may be provided with a fixed or constant impedance section at its ground end, if desired. Such remaining signal is applied through limiter 73 to the moving means for roll bar 17 resulting in a displacement thereof to the left as shown in Fig. 6. Responding to this roll command the pilot displaces cyclic pitch stick 11 to the left. The craft immediately banks to an angle determined by the magnitude of the limited radio displacement signal and roll signal from vertical gyro 26 is generated and applied to roll bar 17 to zero the same, anticipation being provided by the rate of change of this gyro signal as supplied by rate circuit 51. The resulting bank angle will cause the craft to move laterally toward the beam at a rate determined by the magnitude of the bank angle. As the beam displacement signal is reduced the roll angle command is likewise reduced and responding to such command the pilot takes out bank angle and thereby decreases the rate of approach of the craft to the beam until finally when the craft is on the beam the roll angle is zero and hence the craft has asympotically (in speed) approached and is thereafter maintained on the beam.

It is readily apparent that such operation may be of great importance under heavy terminal traffic conditions or under emergency terminal traffic conditions. For example, if the localizer beam must be cleared quickly to enable another craft to land, traffic control officers at the heliport or terminal may request that the helicopter be displaced from the beam by a predetermined amount and hold its position at this point. This may readily be accomplished with the apparatus of the present invention by means of a suitable hold-off signal generating device 140 which biases the radio displacement signal or supplies an additional equivalent displacement signal to the roll channel. In effect then, the beam center is displaced and responding to the commands of the indicator or roll bar 17 the pilot slides off the beam to the desired displacement or "hold-off" point.

In Fig. 16 there is illustrated a modification of the signal correlation portion of the system of the invention illustrated in Fig. 2. In this modification the correlation of the radio displacement, heading, roll, and yaw rate signals as a function of air speed is accomplished or carried out by means of variable gain amplifiers interconnecting the various signals, the gains thereof being varied as a function of air speed. In this modification means are also provided for quickly and easily reducing the radio displacement signal without the need for a heading change, i. e., by a roll maneuver only of the craft. As shown in Fig. 16 the roll error and its rate are combined and supplied to roll bar 17 for enabling the craft to be stabilized about its roll axis as above. Similarly, the heading error and yaw rate signals are combined as in Fig. 2 and applied to the yaw pointers 21 for providing yaw stabilization of the craft as above. The correlation between heading and roll is accomplished in a manner similar to that shown in Fig. 12 wherein the yaw error signal is applied to an amplifier 82 whose gain is varied directly as a function of air speed and the correlation of the heading error signal and the yaw rate signal is accomplished in a manner similar to that illustrated in Fig. 13 wherein the yaw rate signal is applied to variable gain amplifier 84, the gain of which is varied directly as a function of air speed. However, in Fig. 16 the radio displacement signal derived from receiver 104 and its associated networks 105, 106 and 107 of Fig. 2 is applied to a first variable gain amplifier 108, the output thereof being combined with the heading error signal and the variable yaw rate output of amplifier 84, the algebraic sum of these signals being applied to yaw pointer 21. Also, the radio displacement signal is applied directly to the roll channel through a second variable gain amplifier 109, the gain of which is also varied in accordance with the craft air speed. Thus, the operation of the modification of Fig. 16 is similar in many respects to the operation of the system in Figs. 2, 12 and 13, that is, at high air speeds a radio displacement error is corrected by changing the craft heading through a banking maneuver of the aircraft but at low and zero air speeds the radio displacement signal is applied directly to the roll channel while the heading signal is removed therefrom since under these conditions the gain of amplifiers 82 and 108 is substantially zero. In order to correct a beam displacement, the pilot merely rolls the aircraft in response to movement of the pointer 17 by the beam displacement signal and the aircraft moves laterally of the beam as illustrated in Fig. 6. Since the radio displacement signal is limited as at 107 (Fig. 2) the bank angle required to zero this limited signal is likewise limited, which limits the rate at which the craft laterally approaches the beam center. In Fig. 16 as in Figs. 12 to 15 the gain characteristics of the amplifiers have been graphically illustrated; however it is to be understood that these gain curve characteristics are purely illustrative and may be changed to suit particular flight conditions and requirements and various aircraft configurations.

The apparatus of the present invention is adapted continuously to control all of the various and peculiar flight characteristics of rotary wing aircraft such as helicopters. For example, a helicopter may ascend or descend at any angle and at any speed or rate, as described above. Likewise in accordance with another object of the present invention the aircraft may be caused to follow a glide slope beam of an instrument landing system, the response of the aircraft, to the glide slope beam error in pitch and in altitude, being correlated or varied as a function of the angle that the glide slope beam makes with the ground surface. It is known that in present glide slope beam installations there are a number of secondary lobes which define several glide slope paths having angles greater than the usual 2½° angle of the main lobe, such paths being perhaps at angles at 7°, 20°, 40°, etc. depending upon the propagation antenna, ground terrain etc. If it is desired to approach and maintain one of these higher angled glide slope beam lobes, the pilot, knowing his altitude and approximate distance from the glide slope transmitter through the usual marker beacons, can count the beam centers as he passes through them, by observing but not responding to the movements of the horizontal bar 16 and pointer 19, until the desired beam is intercepted at which time he controls the craft in accordance with the deflections of the horizontal bar 16 and/or pointer 19 produced by this desired beam radiation in a manner to be described. On the other hand, it is possible that the angle of the main lobe of the glide slope transmitter may be varied especially at terminals for the exclusive use of helicopters. In either case, glide slope receiver 115 responsive to such a radio beam produces an output signal proportional to the displacement of the craft therefrom. This signal is modulated as at 116 and applied to amplifier 117, the output of which is limited at 118 and applied to amplifier 119. If desired glide slope rate signals may also be provided as at 119'. The glide slope signal output of amplifier 119 is applied to a coupling transformer 120 across the secondary of which are connected correlating potentiometers 121 and 122 having opposed ends thereof connected to ground. The output of wiper 123 and 124 thereof, is applied respectively to the pitch channel of the indicator 15 for actuating horizontal bar 16 and to the altitude channel thereof for actuating altitude pointer 19. The relative magnitudes of the glide slope signal supplied to each of these channels is varied as a function of the angle of descent of the glide slope beam or the angle of the desired or selected secondary lobe of the glide slope beam. In addition, these potentiometers may also be adjusted in accordance with the magnitude of any head wind or tail wind prevailing as will be further described.

In the control of the helicopter during an approach operation on a glide slope beam having a low angle of descent, such as the normal 2½° glide slope, the rate of descent or rate of change of altitude is relatively low and the air speed relatively high. Thus, in order to correct for a glide slope error the most sensitive craft control is through operation of the collective pitch stick or through altitude control. On the other hand, when the angle of the glide slope beam is high the rate of descent is high and the air speed is low. Under this condition, the most sensitive control for correcting a glide slope displacement error is to control craft air speed through pitch attitude by means of the cyclic pitch control stick. Thus, in order to accomplish the above, further changes of signal sensitivities in the pitch and altitude channels as a function of angle of descent is required.

For this purpose, there is provided a suitably calibrated angle of descent selector 125 which mechanically adjusts the wipers 123 and 124 of potentiometers 121 and 122, respectively, in accordance with the angle that the glide slope beam makes with the landing runway. Such adjustment will vary the amount of the glide slope signal that is supplied to amplifier 55 controlling horizontal bar 16 and the amplifier 60 controlling the horizontal pointer 19. In other words such an adjustment will vary the amount of glide slope signal applied in the air speed and altitude channels. Simultaneously, angle of descent selector 125 adjusts the value of the altitude bias displacement signal supplied by bias source 100 as a function of angle of descent as by means of potentiometer 101. Angle of descent selector 125 also simultaneously adjusts the value of the airspeed signal supplied in the pitch channel as by means of potentiometer 129. At this time it should be pointed out that an interlock 130 actuated by the "Approach" switch (not shown) of the flight plan selector switch operates, when in the "approach" position, to set the air speed selector 94 to its maximum air speed position, thereby supplying a maximum voltage across winding 131 of potentiometer 129. In effect, manual air speed selector 94 is replaced by the angle of descent selector 125. Thus, when a low angle of descent is selected, the pilot simultaneously selects a high forward air speed, and also simultaneously the glide slope error signal is attenuated in the air speed control channel and is increased in the altitude control channel and vice versa for high angles of descent. If desired a further interlock 130' coupled with the approach selector switch may be provided for throwing switches 100' and 101' to their B positions whereby automatically to cut out altitude control 57, and insert the rate of climb or dive control 100 and 101.

Figure 9:
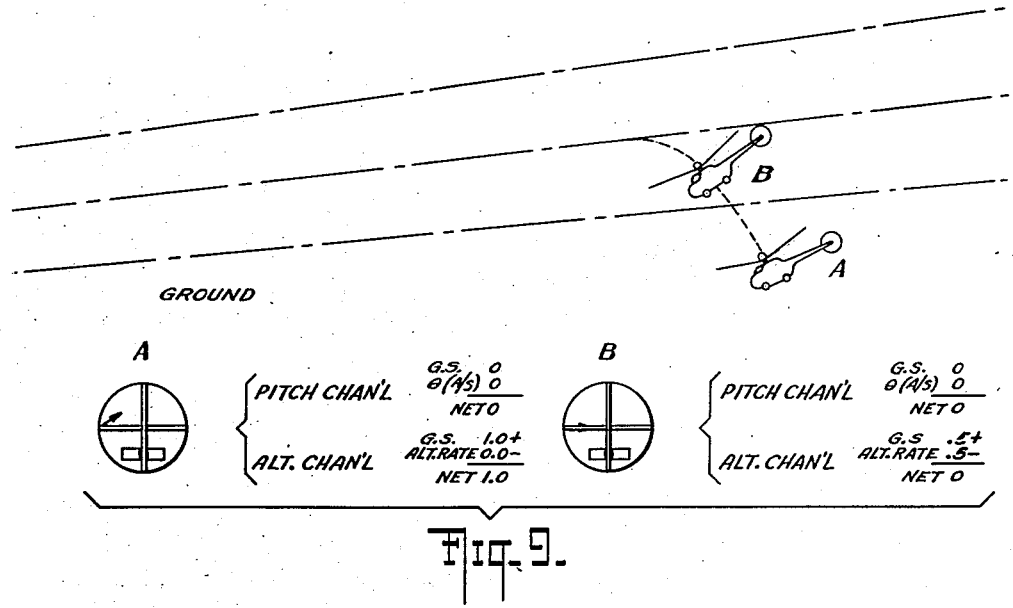
Figs. 9 and 10 are diagrams illustrating the operation of the present invention when the craft is seeking the glide slope beam of an instrument landing system under various glide slope beam angles.
Figure 10:
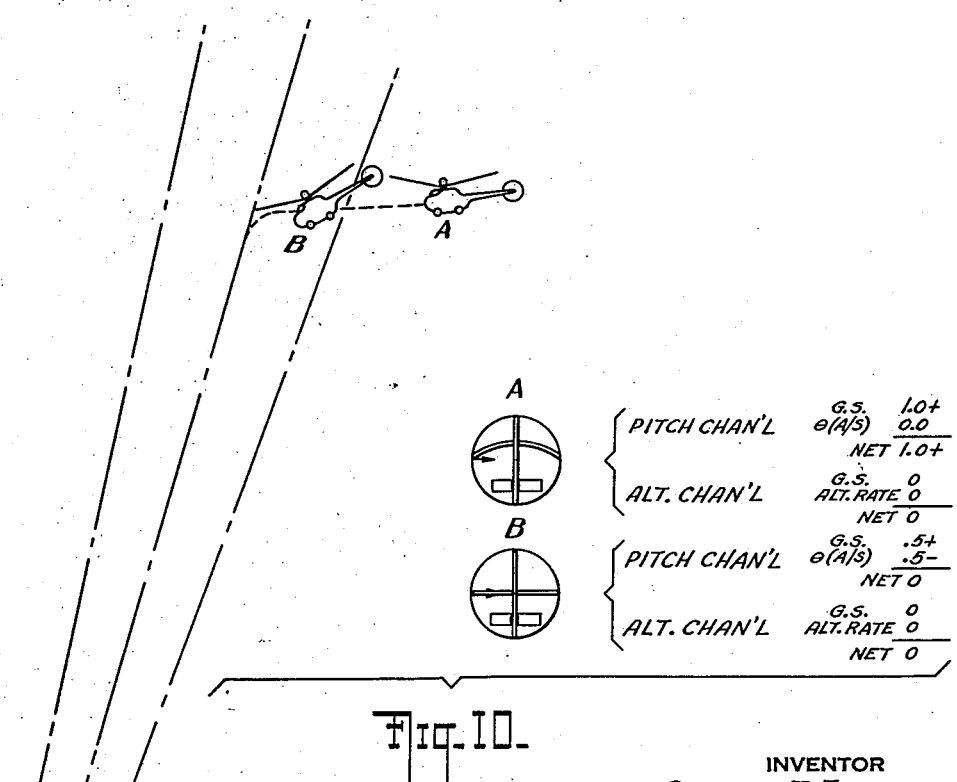

Operation of the apparatus in a glide slope coupling mode will be described in connection with Figs. 9 and 10 wherein there is illustrated two conditions of approach. In Fig. 9 the glide slope is illustrated as the normal 2½° slope while in Fig. 10 the glide slope is illustrated as being very steep, i. e., making a large angle with the landing runway. In Fig. 9 the angle of descent controller 125 is set at 2½ degrees. With this setting the glide slope error signal is being applied primarily to altitude pointer 19 of indicator 15 from transformer 120 and coordination potentiometer 122, 124. Similarly selector 125 also positions the wiper of potentiometer 101 such that the portion of the bias voltage supplied by source 100 will be cancelled by a rate signal from rate circuit 58 when the rate of descent of the craft corresponds to the 2½° slope of the glide slope beam at the adjusted air speed. The latter is adjusted by angle of descent selector 125 which positions potentiometer 129 to thereby provide an air speed voltage which is cancelled by the pitch attitude voltage supplied by a vertical gyro 26 when the actual craft air speed corresponds to a predetermined air speed for a 2½° slope. The relative magnitudes or proportions of the altitude control signal and air speed control signal are adjusted so that when the pilot selects a particular angle of descent, the air speed and altitude control signals will automatically define or correspond to this angle of descent when the craft is flown by the pilot in a manner to maintain the bar and pointers of the instrument zeroed and centered.

Thus, if the aircraft is displaced below the beam center, as in Fig. 9, the glide slope error signal is applied predominately to pointer 19 commanding a change in the collective pitch settings of helicopter rotor blades to produce a change in craft altitude. The pilot, responding to such a pointer deflection, operates cyclic pitch stick 13 until the pointer is zeroed. Such motion of collective stick 13 reduces the rate of descent and may cause a rate of climb depending upon the magnitude of the glide slope error. As this glide slope error is reduced and approaches zero, the rate of descent or ascent signal will predominate and cause an opposite deflection of altitude pointer 19, thereby commanding the pilot to again make a correction in the position of the collective stick 13. As above, rate circuit 58' or collective stick pick-off 88 provides acceleration or anticipation control for pointer 19. For correction of a glide slope error from a point above the glide slope beam the operation of the system is similar, the pilot increasing the rate of descent to correct for such error.

In coupling to a glide slope beam having a steep angle with respect to the runway, the pilot selects this angle by means of angle of descent selector 125 thereby inserting most of the glide slope error signal into the pitch bar 16 channel by means of correlation potentiometer 121. As above, angle of descent selector 125 also selects a very high rate of descent by attenuating very little of the bias voltage from source 100 through potentiometer 101 thereby requiring a high rate signal from rate circuit 58 for cancellation. Similarly he selects a very low air speed by attenuation of the air speed signal from the voltage source for selector potentiometer 92, through potentiometer 129 whereby a low air speed signal from servo 77 will cancel the same. The glide slope error signal in this configuration is corrected by changing craft air speed through pitch attitude control by maintaining bar 16 centered or zeroed.

The above applies in case of still air conditions. In accordance with another object of the present invention and as illustrated in Fig. 17, the apparatus may be adjusted for head or tail winds encountered during a landing configuration. In case there is a strong head wind its effect will reduce air speed and hence will upset the correlation between altitude rate and air speed for the selected angle of descent. A tail wind of course will have the opposite effect. Therefore, head or tail wind compensation may be effected by changing the angle of descent selection. This is accomplished in the present apparatus by means of wind selector knob 126. Rotation of this knob in effect changes the angle of descent selection through a suitable mechanical differential 127. The effects of cross winds may be similarly compensated as by inserting into the roll channel a bias signal corresponding to the magnitude and direction of the cross wind. Furthermore the effects of quartering winds may be compensated by proper resolution of the wind components between the angle of descent or fore and aft and altitude control indicators 16 and 19 and the roll or lateral craft control indicators 17 and 21.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a flight control system for aircraft capable of sustained flight at substantially zero air speed including at least two signal responsive means for providing outputs respectively indicative of required changes in craft attitude about at least two of its primary axes to cause said craft to approach and maintain a desired craft attitude about one of said axes, said craft attitudes about said two axes being independent of each other at zero air speeds but dependent on each other at air speeds greater than zero, comprising means for supplying an error signal corresponding to the difference between the existing craft attitude about said one axis and the desired craft attitude thereabout, means connected to receive said error signal for supplying control signals to said two signal responsive means whereby to respectively control the outputs thereof in accordance with said error signal, and air speed responsive means coupled with said last-mentioned means for continuously varying the relative magnitudes of said control signals supplied to said signal responsive means in accordance with craft air speed.

2. In a flight control system for aircraft comprising signal-responsive means for producing outputs respectively indicative of required changes in craft heading and roll attitudes to cause said craft to approach and maintain a desired heading, means for supplying a signal corresponding to the magnitude of the desired heading change, means connected to receive said heading signal for supplying control signals to said signal-responsive means whereby to control the outputs thereof in accordance with magnitude of said heading signal, and means connected with said last-mentioned means for continuously varying the relative magnitudes of said control signals in accordance with the air speed of said craft whereby to control the relation between craft heading and craft roll in accordance with craft air speed.

3. An aircraft flight control system for enabling the craft to approach and thereafter maintain a selected heading comprising a first signal responsive means for providing a first output indicative of a required change in craft roll attitude to cause said craft to approach and maintain said selected heading, a second signal responsive means for providing a second output indicative of a required change in craft yaw attitude to cause said craft to approach and maintain said selected heading, means for providing an error signal corresponding to the magnitude of the desired heading change, means for providing a signal corresponding to the roll attitude of said craft, means for providing a signal corresponding to the rate of yaw of said craft, means for supplying said error signal and said roll attitude signal to said first signal responsive means for controlling the same in accordance with the algebraic sum thereof, means for supplying said error signal and said rate of yaw signal to said second signal responsive means for controlling the same in accordance with the algebraic sum thereof, and means for varying the relative magnitude of the heading error signal supplied to each of said signal responsive means in accordance with craft air speed.

4. A craft flight control system for the character set forth in claim 3 wherein the relative magnitude of said heading deviation signal supplied to said last two mentioned means is simultaneously varied in accordance with craft air speed.

5. An air craft flight control system of the character set forth in claim 3 wherein the relative magnitude of said heading deviation signal supplied to last two mentioned means is simultaneously and progressively varied in accordance with craft air speed.

6. A navigation system for aircraft for enabling the craft to be caused to approach and thereafter maintain a selected heading comprising means for supplying a signal corresponding to the error between the present heading of said craft and said selected heading, means for supplying a signal corresponding to the roll angle of said aircraft, means for combining said signals for supplying an output corresponding to the algebraic sum thereof, and means responsive to the air speed of said craft for continuously varying the magnitude of one of said signals supplied to said combining means.

7. A navigation system of the character set forth in claim 6 wherein the one of said signal supplied to said combining means is said heading deviation signal.

8. A navigation instrument for aircraft for enabling the craft to be caused to approach and thereafter maintain a selected heading comprising an indicator having a pointer normally centered in the face of the instrument not only when the craft is on the selected heading but also when the attitude of the craft is such that it will asymptotically approach said heading, means for supplying a signal corresponding to the error between the present heading of said craft and said selected heading, means for supplying a signal corresponding to the roll angle of said craft, means responsive to both of said signals for controlling said pointer in accordance with the algebraic sum thereof, and means responsive to the air speed of said craft for continuously varying the magnitude of one of said signals supplied to said pointer control means.

9. A navigation instrument as set forth in claim 8 wherein the one of said signals supplied to said combining means is said heading deviation signal.

10. A navigation instrument for rotary wing aircraft for enabling the craft to be caused to approach and thereafter maintain a selected heading comprising an indicator having first and second pointers both normally centered in the face of the instrument not only when the craft is on the selected heading but also when the attitude of the craft about its yaw and roll axis is such that it will approach said heading, means for supplying a signal corresponding to the error between the present heading of said aircraft and said selected heading, means for supplying a signal corresponding to the rate of yaw of said aircraft, means for supplying a signal corresponding to the roll angle of said aircraft, first means responsive to said heading and yaw rate signals for controlling said first point in accordance with the algebraic sum thereof, second means responsive to said heading and roll signals for controlling said second point in accordance with the algebraic sum thereof, and means responsive to the air speed of said craft for progressively transferring said heading signal from said first means to said second means with increasing air speeds and for progressively transferring said heading signal from said second means to said first means with decreasing craft air speeds.

11. A craft navigation system by means of which the craft may be controlled to approach and thereafter maintain a desired heading comprising means for supplying a heading deviation signal corresponding to the difference between the existing craft heading and a desired craft heading, means for supplying a signal corresponding to the rate of yaw of said craft, means for supplying a signal corresponding to the angle of roll of said aircraft, means responsive to said heading deviation signal and said yaw rate signal for supplying a first turn control signal corresponding to the algebraic sum thereof, means responsive to said heading deviation signal and said angle of roll signal for supplying a second turn control signal corresponding to the algebraic sum thereof, and means responsive to the air speed of said craft for varying the relative magnitude of said heading deviation signal supplied to each of said last-two-mentioned means whereby to vary the relative responses thereof in accordance with the air speed of said craft.

12. A craft navigation system of the character set forth in claim 11 wherein the relative magnitude of said heading deviation signal supplied to said last-two-mentioned means is simultaneously varied in accordance with craft air speed.

13. A craft navigation system of the character set forth in claim 11 wherein the relative magnitude of said heading deviation signal supplied to said last-two-mentioned means is simultaneously and progressively varied in accordance with craft air speed.

14. Apparatus as set forth in claim 11 wherein said means responsive to the air speed of the craft for varying said heading signal comprises variable impedance means connected to receive said heading deviation signal, and means for varying the value of impedance thereof in accordance with craft air speed whereby to vary the magnitude of said heading signal supplied to said last-two-mentioned means in accordance with craft air speed.

15. A craft navigation system by means of which the craft may be controlled to approach and thereafter maintain a desired heading comprising means for supplying a heading deviation signal corresponding to the difference between the existing craft heading and a desired craft heading, means for supplying a signal corresponding to the rate of yaw of said aircraft, means for supplying a signal corresponding to the angle of roll of said aircraft, first means responsive to said heading deviation signal and said yaw rate signal for supplying a first turn control signal corresponding to the algebraic sum thereof, second means responsive to said heading deviation signal and said angle of roll signal for supplying a second turn control signal corresponding to the algebraic sum thereof, means for limiting said heading deviation signal to a predetermined fixed value whereby respectively to limit the magnitude of said first and second turn control signals to thereby limit the rate of approach of said craft to said desired heading when controlled in accordance therewith, and means responsive to the air speed of the craft for varying the relative magnitude of said limited heading deviation signal supplied to said first and second signal responsive means whereby to vary the relative response thereof in accordance with the air speed of said craft.

16. An aircraft navigation system by means of which an aircraft may be controlled to approach and thereafter maintain a desired ground track comprising, means for supplying a signal corresponding to the displacement of said craft from said track, means for supplying a signal corresponding to deviations in the heading of said craft from the bearing of said ground track, means for combining said displacement and heading signals for supplying input control signal proportional to the algebraic sum thereof, means for supplying a signal corresponding to the rate of yaw of said aircraft, means for supplying a signal corresponding to the angle of roll of said aircraft, means responsive to said input control signal and said yaw rate signal for supplying a first output control signal corresponding to the algebraic sum thereof, means responsive to said input control signal and said angle of roll signal for supplying second output control signal corresponding to the algebraic sum thereof, and means responsive to the air speed of said craft for varying the relative magnitude of said input control signal supplied to each of said last-two-mentioned means whereby to vary the relative magnitudes of said first and second output signals in accordance with the air speed of said craft.

17. An aircraft navigation system as set forth in claim 16 wherein said means responsive to the air speed of the craft for varying said input control signal comprises variable impedance means connected to receive said input signal, and means for varying the value of impedance thereof in accordance with craft air speed whereby to vary the relative magnitudes of said first and second output signals in accordance with craft air speed.

18. An aircraft navigation system by means of which an aircraft may be controlled to approach and thereafter maintain a desired ground track comprising means for supplying a signal corresponding to the displacement of said craft from said track, means for supplying a signal corresponding to deviations in the heading of said craft from the bearing of said ground track, means for combining said displacement and heading signals for supplying an input control signal proportional to the algebraic sum thereof, means for limting said displacement signal to a predetermined maximum value whereby to limit the angle of approach of said craft when operated in accordance with said input signal, means for supplying a signal corresponding to the rate of yaw of said aircraft, means for supplying a signal corresponding to the angle of roll of said aircraft, means responsive to said input control signal and said yaw rate signal for supplying a first output control signal corresponding to the algebraic sum thereof, means responsive to said input control signal and said angle of roll signal for supplying a second output control signal corresponding to the algebraic sum thereof, and means responsive to the air speed of said craft for varying the relative magnitudes of said input signal supplied to each of said last-two-mentioned means whereby to vary the relative magnitudes of said first and second output signals in accordance with the air speed of said craft.

19. A navigation instrument for manually piloted, rotary wing aircraft for separately indicating the amount of control about the craft roll and yaw axes required to cause said craft to approach and thereafter maintain a selected heading, said instrument including an indicator having a roll pointer and a yaw pointer both normally centered in the face of the indicator not only when the craft is on the selected heading but also when the roll and yaw attitude of the craft is such that it will asymptotically approach said heading, means for supplying a heading deviation signal corresponding to the difference between the existing craft heading and a selected craft heading, means for supplying a signal corresponding to the angle of bank of said craft, means for supplying a signal corresponding to the rate of yaw of said craft, means responsive to said heading deviation signal and said bank angle signal for supplying an output signal to said roll pointer varying in accordance with the algebraic sum thereof whereby to indicate the bank angle required to maintain said pointer so centered, means responsive to said heading deviation signal and said yaw rate signal for supplying a signal to said yaw pointer varying in accordance with the algebraic sum thereof whereby to indicate the rate of yaw required to maintain said yaw pointer so centered, and means for varying the relative magnitude of said heading deviation signal supplied to each of said last-two-mentioned means in accordance with the air speed of said aircraft whereby to vary the relative movement of said pointers under varying craft air speeds.

20. A navigation instrument for manually piloted, rotary wing aircraft for indicating the amount of control about the craft pitch axis required to cause said craft to approach and thereafter maintain a desired air speed, said instrument including an indicator having a substantially horizontal pointer normally centered in the face of the indicator not only when the craft is at the selected air speed but also when the pitch attitude of the craft is such that it will asymptotically approach said air speed, actuating means for said pointer, means for supplying an air speed error signal corresponding to the difference between the existing air speed and the desired air speed, means for supplying a signal corresponding to the pitch angle of said craft, and means responsive to said air speed error signal and said pitch attitude signal for supplying a control signal to said pointer actuating means varying in accordance with the algebraic sum thereof.

21. A navigation instrument as set forth in claim 20 further including means for limiting the magnitude of said air speed error signal whereby to limit the pitch attitude of said craft when controlled in accordance with deflections of said pointer from its normally centered position on the face of said indicator.

22. A navigation instrument for manually piloted, rotary wing aircraft having means for controlling the collective pitch of the rotary wings thereof whereby to control the altitude of said craft, said instrument comprising an indicator for indicating the amount of control of said collective pitch control means required to cause said craft to approach and thereafter maintain a desired altitude, a pointer normally horizontally centered with respect to the face of said indicator not only when the craft is at the desired altitude but also when the collective pitch of said wings is such that it will asymptotically approach said altitude, actuating means for said pointer, means for supplying an altitude error signal corresponding to the difference between the existing craft altitude and the desired craft altitude, means for supplying a signal corresponding to the displacement of said collective pitch control means, and means for combining said signals for supplying a control signal to said pointer-actuating means varying in accordance with the algebraic sum thereof.

23. An aircraft navigation system by means of which an aircraft may be controlled to approach and thereafter maintain a desired ground track comprising means for supplying a signal corresponding to the displacement of said craft from said track, means for supplying a signal corresponding to deviations in the heading of said craft from the bearing of said ground track, means for combining said displacement and heading signals for supplying an input control signal proportional to the algebraic sum thereof, means for limiting said displacement signal to a predetermined maximum value whereby to limit the angle of approach of said craft when operated in accordance with said input control signal, means for supplying a signal corresponding to the rate of yaw of said aircraft, means for supplying a signal corresponding to the angle of roll of said aircraft, first signal-responsive means responsive to said input control signal and said yaw rate signal for supplying a first output control signal corresponding to the algebraic sum thereof whereby to control the rate of turn of said craft when operated in accordance therewith, second signal-responsive means responsive to said input control signal and said angle of roll signal for supplying a second output control signal corresponding to the algebraic sum thereof whereby to control the rate of turn of said craft when operated in accordance therewith, means for limiting the magnitude of said input control signal to some predetermined maximum value whereby to limit the rates of turn of said craft when operated in accordance with said first and second output control signals, and means responsive to the air speed of said craft for varying the relative magnitude of said input control signal supplied to each of said first and second signal responsive means whereby to vary the relative response thereof in accordance with the air speed of said craft.

24. A navigation instrument for manually piloted, rotary wing aircraft for separately indicating the amount of control about the craft roll and yaw axes required to cause said aircraft to approach and thereafter maintain a selected ground track, said instrument including an indicator having a roll pointer and a yaw pointer both normally centered in the face of the indicator not only when the craft is on the selected ground track but also when the roll and yaw attitude thereof is such that it will asymptotically approach said ground track, means for supplying a signal corresponding to the displacement of said craft from said ground track, means for supplying a signal corresponding to deviations in the heading of said craft from the bearing of said ground track, means for combining said displacement and heading signals for supplying an input control signal proportional to the algebraic sum thereof, means for supplying a signal corresponding to the angle of roll of said aircraft, means responsive to said input control signal and said angle of roll signal for supplying an output signal to said roll pointer varying in accordance with the algebraic sum thereof whereby to indicate the bank angle required to maintain said pointer so centered, means for supplying a signal corresponding to the rate of yaw of said aircraft, means responsive to said input control signal and said rate of yaw signal for supplying a signal to said yaw pointer varying in accordance with the algebraic sum thereof whereby to indicate the rate of yaw required to maintain said pointer so centered, and means for varying the relative magnitude of said input control signal supplied to each of said pointers in accordance with the air speed of said craft, whereby to vary the relative response to said pointers under varying craft air speeds.

25. A navigation system for rotary wing aircraft by means of which said aircraft may be controlled to approach and thereafter maintain a selected heading comprising means for supplying a signal corresponding to the error between the present heading of said craft and said selected heading, means for supplying a signal corresponding to the rate of yaw of said aircraft, means for combining said signals for supplying first control output corresponding to the algebraic sum thereof, means for supplying a signal corresponding to the roll angle of said craft, means for combining said heading error signal and said roll angle signal for supplying a second control output corresponding to the algebraic sum thereof, and means responsive to the air speed of said craft for varying the magnitude of one of said signals supplied to the first of said last-two-mentioned means and for simultaneously varying the magnitude of one of said signals supplied to the second of said last-two-mentioned means.

26. A navigation system for rotary wing aircraft by means of which said aircraft may be controlled to approach and thereafter maintain a selected heading comprising means for supplying a signal corresponding to the error between the present heading of said craft and said selected heading, means for supplying a signal corresponding to the rate of yaw of said aircraft, means for combining said signals for supplying a first control output corresponding to the algebraic sum thereof, means for supplying a signal corresponding to the roll angle of said craft, means for combining said heading error signal and said roll angle signal for supplying a second control output corresponding to the algebraic sum thereof, and means responsive to the air speed of said craft for varying the magnitude of said heading error signal supplied to a first of said last-two-mentioned means and for simultaneously varying the magnitude of one of said signals supplied to the second of said last-two-mentioned means.

27. A navigation system for rotary wing aircraft by means of which said aircraft may be controlled to approach and thereafter maintain a selected heading comprising means for supplying a signal corresponding to the error between the present heading of said craft and said selected heading, means for supplying a signal corresponding to the rate of yaw of said aircraft, means for combining said signals for supplying an output corresponding to the algebraic sum thereof, means for supplying a signal corresponding to the roll angle of said craft, means for combining said heading error signal and said roll angle signal for supplying a second output corresponding to the algebraic sum thereof, and means responsive to the air speed of said craft for varying the magnitude of said roll angle signal supplied to the first of said combining means and for simultaneously varying the magnitude of said yaw rate signal supplied to said second combining means.

28. A craft navigation system by means of which a craft may be controlled to approach and thereafter maintain a desired heading comprising means for supplying a heading deviation signal corresponding to the difference between the existing craft heading and a desired craft heading, means for supplying a signal corresponding to the rate of yaw of said craft, means for supplying a signal corresponding to the angle of roll of said aircraft, first amplifier means responsive to said heading deviation signal, means responsive to the output of said first amplifier and said yaw rate signal for supplying a first output control signal corresponding to the algebraic sum thereof, second amplifier means responsive to said heading deviation signal, means responsive to the output of said second amplifier and said angle of roll signal for supplying a second output control signal corresponding to the algebraic sum thereof, and means responsive to the air speed of said craft for varying the relative gains of said first and second amplifier means whereby to vary the relative magnitude of said heading deviation signal supplied to each of said output control signal supplying means to thereby vary the relative response thereof in accordance with the air speed of said craft.

29. The navigation system set forth in claim 28 wherein the gain of said first amplifier is varied inversely with craft air speed and wherein the gain of said second amplifier is varied directly with craft air speed.

30. An aircraft navigation system for enabling the craft to be caused to approach and thereafter maintain a selected heading comprising means for supplying a signal corresponding to the error between the present craft heading and said selected heading, means for supplying a signal corresponding to the bank angle of said craft, means for combining said signals for supplying an output corresponding to the algebraic sum thereof, means for limiting the magnitude of said heading signal whereby to limit said craft bank angle when said craft is controlled in accordance with the output of said combining means, and means responsive to the air speed of said craft for continuously varying the limits imposed by said limiting means whereby to control the magnitude of said bank angle in accordance with the air speed of the craft.

31. A craft navigation system by means of which a craft may be controlled to approach and thereafter maintain a desired heading comprising means for supplying a heading deviation signal corresponding to the difference between the existing craft heading and a desired craft heading, means for supplying a signal corresponding to the rate of yaw of said craft, means for supplying a signal corresponding to the angle of roll of said aircraft, means responsive to said heading deviation signal and said rate of yaw signal for supplying a first output control signal corresponding to the algebraic sum thereof, amplifier means responsive to said heading deviation signal, means responsive to the output of said amplifier means and said angle of roll signal for supplying a second output control signal corresponding to the algebraic sum thereof, and means responsive to the air speed of said craft for varying the magnitude of said rate of yaw signal and the gain of said amplifier means, whereby to vary the relative response of said first and second output control signals under varying craft air speeds.

32. Apparatus as defined in claim 31 wherein the means for supplying a signal corresponding to the rate of yaw of said aircraft comprises a rate of yaw gyroscope and signal generating means coupled therewith for supplying said rate of yaw signal, and the means for varying the magnitude of said rate of yaw signal in accordance with the air speed of said craft comprises means coupled with said signal generating means for varying the output thereof in accordance with air speed.

33. An aircraft navigation system by means of which an aircraft may be controlled to approach and thereafter maintain a desired ground track comprising means for supplying a signal corresponding to the displacement of said craft from said track, means for supplying a signal corresponding to deviations in the heading of said craft from the bearing of said ground track, means for supplying a signal corresponding to the roll angle of said craft, combining means responsive to said heading deviation and roll signals, means for varying the magnitude of said heading deviation signal supplied to said combining means in accordance with the air speed of said craft, means for supplying said displacement signal to said combining means, and means for varying the magnitude of said displacement signal supplied to said combining means in accordance with the air speed of said craft.

34. An aircraft navigation system by means of which an aircraft may be controlled to approach and thereafter maintain a desired ground track comprising means for supplying a signal corresponding to the displacement of said craft from said track, means for supplying a signal corresponding to the deviations in the heading of said craft in the bearing of said track, means for supplying a signal corresponding to the roll angle of the craft, means for supplying a signal corresponding to the rate of yaw of said craft, first combining means responsive to said heading and roll signals for providing a first output control signal in accordance with the algebraic sum thereof, means for varying the magnitude of said heading signal supplied to said combining means in accordance with craft air speed, second combining means responsive to said heading and yaw rate signals for supplying a second output control signal in accordance with the algebraic sum thereof, means for supplying said displacement signal to said first and second combining means whereby to modify said first and second output control signals in accordance therewith, and means for varying the magnitude of said displacement signal in accordance with craft air speed, whereby to vary the relative magnitudes of said first and second output control signals in accordance with craft air speed.

35. An aircraft navigation system as set forth in claim 34 further including means for varying the magnitude of said heading signal supplied to said second combining means in accordance with craft air speed.

36. An aircraft navigation system as set forth in claim 34 further including means for varying the magnitude of said yaw rate signal supplied to said second combining means in accordance with craft air speed.

37. An aircraft navigation system by means of which an aircraft may be controlled to approach and thereafter maintain a glide slope landing beam, said beam being adapted to define a plurality of radio paths having various angles of descent, means for providing a signal corresponding to the displacement of said craft from said beam, means for providing a signal corresponding to the air speed of said aircraft, means responsive to said displacement and air speed signals for supplying a first output control signal corresponding to the algebraic sum thereof, means for supplying a signal corresponding to the altitude of said aircraft, means responsive to said displacement and altitude signals for supplying a second output control signal corresponding to the algebraic sum thereof, and means for varying the relative magnitudes of said first and second output control signals as a function of the angle of descent of said glide slope beam whereby at high angles of descent said craft may be controlled to approach and maintain said glide slope beam primarily by controlling craft air speed and at low angles of descent primarily by controlling craft altitude.

38. An aircraft navigation system by means of which an aircraft may be controlled to approach and thereafter maintain a glide slope landing beam, said beam being adapted to define a plurality of radio paths having various angles of descent, means for providing a signal corresponding to the displacement of said craft from said beam, means for providing a signal corresponding to the air speed of said aircraft, first combining means responsive to said displacement and air speed signals for supplying a first output control signal corresponding to the algebraic sum thereof, means for supplying a signal corresponding to the altitude of said aircraft, second combining means responsive to said displacement and altitude signals for supplying a second output control signal corresponding to the algebraic sum thereof, and means for varying the relative magnitudes of said first and second output control signals as a function of the magnitude of wind velocity in a direction substantially parallel to said beam whereby under head wind conditions said craft may be controlled to approach and maintain said glide slope beam primarily by controlling craft air speed and at low angles under tail wind conditions said craft may be so controlled primarily by controlling craft altitude.

39. An aircraft navigation system as set forth in claim 38 wherein said last-mentioned means comprises adjustable means responsive to said displacement signal for supplying said displacement signal to said first and second combining means, and means for adjusting said adjustable means in accordance with the magnitude of said wind velocity.

40. An aircraft navigation system by means of which an aircraft may be controlled to approach and thereafter maintain a glide slope landing beam, means for providing a signal corresponding to the displacement of said craft from said beam, altimeter means for supplying a signal dependent upon the altitude of said craft, and means responsive to said signals for supplying a control signal proportional to the algebraic sum thereof.

41. An aircraft navigation system as set forth in claim 40 wherein said signal dependent upon the altitude of said craft is proportional to the rate of change of craft altitude.

42. An aircraft control system by means of which an aircraft may be controlled to approach and thereafter maintain a glide slope landing beam, said beam being adapted to define a radio path having variable angles of descent, means for providing a signal corresponding to the displacement of said craft from said glide slope beam, means for providing a signal corresponding to the air speed of said craft, means for providing a signal corresponding to the pitch attitude of said craft, first means for combining said displacement, air speed, and pitch signals for supplying a first output control signal corresponding to the algebraic sum thereof, means for providing a signal corresponding to a predetermined rate of change of altitude of said aircraft determined by the angle of descent of said beam, means for providing a signal corresponding to the actual rate of change of altitude of said aircraft, second means for combining said displacement, said predetermined altitude rate, and said actual altitude rate signals for supplying a second output control signal corresponding to the algebraic sum thereof, means for varying the ratio of said air speed and pitch signals supplied to said first combining means and for simultaneously varying the magnitude of said displacement signal supplied thereto as a function of the angle of descent of said glide slope beam, and means for varying the ratio of said predetermined altitude rate and said actual altitude rate signals supplied to said second combining means and for simultaneously varying the magnitude of said displacement signal supplied thereto as a function of the angle of descent of said glide slope beam, whereby at high angles of descent said craft may be controlled to approach and maintain said glide slope beam primarily by controlling the craft air speed and at low angles of descent primarily by controlling the craft altitude.

References Cited in the file of this patent

UNITED STATES PATENTS

| | | |
|---|---|---|
| 2,620,149 | Strother | Dec. 2, 1952 |
| 2,626,767 | Bromley | Jan. 27, 1953 |
| 2,664,254 | Hendrickson | Dec. 29, 1953 |
| 2,766,953 | Cummings | Oct. 16, 1956 |

UNITED STATES PATENT OFFICE

CERTIFICATE OF CORRECTION

Patent No. 2,845,623

July 29, 1958

George E. Iddings

It is hereby certified that error appears in the printed specification of the above numbered patent requiring correction and that the said Letters Patent should read as corrected below.

Column 6, line 3, for "stock" read -- stick --; line 22, for "eleminates" read -- eliminates --; line 43, for "illustrtaed" read -- illustrated --; column 8, line 30, for "law" read -- yaw --; column 9, line 50, for "aplifiers" read -- amplifiers --; column 10, line 3, for "signa" read -- signal --; column 13, line 1, for "first" read -- just --; column 16, line 8, after "57," insert -- 57′ --.

Signed and sealed this 11th day of August 1959.

(SEAL)
Attest:

KARL H. AXLINE
Attesting Officer

ROBERT C. WATSON
Commissioner of Patents